(12) United States Patent
Schueler et al.

(10) Patent No.: US 10,150,388 B2
(45) Date of Patent: Dec. 11, 2018

(54) ACTUATING DEVICE, IN PARTICULAR FOR A VEHICLE SEAT, AND VEHICLE SEAT

(71) Applicant: Adient Luxembourg Holding S.à.r.l., Luxembourg (LU)

(72) Inventors: Rolf Schueler, Heiligenhaus (DE); Juergen Otto, Burscheid (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 66 days.

(21) Appl. No.: 15/516,541

(22) PCT Filed: Sep. 30, 2015

(86) PCT No.: PCT/EP2015/072602
§ 371 (c)(1),
(2) Date: Apr. 3, 2017

(87) PCT Pub. No.: WO2016/058833
PCT Pub. Date: Apr. 21, 2016

(65) Prior Publication Data
US 2017/0291510 A1    Oct. 12, 2017

(30) Foreign Application Priority Data

Oct. 15, 2014  (DE) .................. 10 2014 220 882
Feb. 5, 2015   (DE) .................. 10 2015 202 081
Feb. 23, 2015  (DE) .................. 10 2015 203 174

(51) Int. Cl.
*B60N 2/235*   (2006.01)
*B60N 2/20*    (2006.01)
*B60N 2/16*    (2006.01)

(52) U.S. Cl.
CPC .......... *B60N 2/2362* (2015.04); *B60N 2/161* (2013.01); *B60N 2/20* (2013.01); *B60N 2/2356* (2013.01); *B60N 2/16* (2013.01); *B60N 2205/50* (2013.01)

(58) Field of Classification Search
CPC ........ B60N 2/2362; B60N 2/161; B60N 2/20; B60N 2/2356; B60N 2/16; B60N 2/235; B60N 2205/50
(Continued)

(56) References Cited

U.S. PATENT DOCUMENTS

2006/0255637 A1* 11/2006 O'Connor .......... B60N 2/01583
                                                      297/331
2012/0261964 A1* 10/2012 Yamaguchi ............. B60N 2/12
                                                      297/378.14
(Continued)

FOREIGN PATENT DOCUMENTS

DE   10 2006 044 490 A1   8/2007
DE   10 2008 026 176 A1   12/2009
(Continued)

*Primary Examiner* — Mark R Wendell
(74) *Attorney, Agent, or Firm* — McGlew and Tuttle, P.C.

(57) ABSTRACT

An actuating device (100) has a first part (5a; 334; 434) and a second part (5b; 310; 412) which can be pivoted about a first axis (A) relative to the first part (5a). A first segment (140) can be coupled to the first part. A second segment (150) can be rotated about the first axis (A) relative to the first segment (140) and can be connected to a locking device of a component (20) and/or to a locking device (350; 450) of another component (330; 430). Rotation of a deflecting element (120) moves a transfer element (130) such that the second segment (150) is not rotated about the first axis (A). Changing a distance between the first axis (A) and a second axis © allows the second segment (150) to be rotated about
(Continued)

the first axis by the transfer element (130). A vehicle seat includes such an actuating device (100).

15 Claims, 7 Drawing Sheets

(58) Field of Classification Search
USPC .................. 297/366, 354.1, 354.12, 354.13
See application file for complete search history.

(56) References Cited

U.S. PATENT DOCUMENTS

| | | | |
|---|---|---|---|
| 2013/0057041 A1* | 3/2013 | Ngiau ...................... | B60N 2/12 |
| | | | 297/354.12 |
| 2013/0161993 A1* | 6/2013 | Otsuka ..................... | B60N 2/22 |
| | | | 297/354.12 |
| 2014/0157939 A1* | 6/2014 | Tonnandl ............. | B60N 2/0296 |
| | | | 74/502.2 |
| 2015/0097405 A1* | 4/2015 | Schukalski .............. | B60N 2/20 |
| | | | 297/354.1 |
| 2016/0016493 A1* | 1/2016 | Deppe ................. | B60N 2/0232 |
| | | | 297/378.12 |

FOREIGN PATENT DOCUMENTS

| | | | |
|---|---|---|---|
| FR | 2 988 656 A1 | 10/2013 | |
| WO | 2009/143999 A1 | 12/2009 | |
| WO | WO-2014001207 A1 * | 1/2014 | ............... B60N 2/20 |

\* cited by examiner

ACTUATING DEVICE, IN PARTICULAR FOR A VEHICLE SEAT, AND VEHICLE SEAT

CROSS REFERENCE TO RELATED APPLICATIONS

This application is a United States National Phase Application of International Application PCT/EP2015/072602, filed Sep. 30, 2015, and claims the benefit of priority under 35 U.S.C. § 119 of German Applications 10 2014 220 882.3, filed Oct. 15, 2014, 10 2015 202 081.9, filed Feb. 5, 2015 and 10 2015 203 174.8, filed Feb. 23, 2015, the entire contents of which are incorporated herein by reference.

FIELD OF THE INVENTION

The invention relates to an actuating device for connecting to a component, in particular of a vehicle seat, wherein the component has a first part and a second part which is pivotable about a first axis relative to the first part.

BACKGROUND OF THE INVENTION

WO 2009/143999 A1 discloses a fitting system for a vehicle seat. The fitting system serves for connecting a back rest of the vehicle seat to a seat substructure of the vehicle seat and permits the angle of inclination of the back rest to be adjusted within an angular range of possible use positions and the back rest to be freely pivoted, in order, for example, to facilitate access to a rear seat row. The fitting system comprises a first fitting which has a driver, which is rotatable about a back rest axis of rotation, for unlocking purposes, a second fitting, a transmission element, which is designed as a shaft, between the two fittings, a free-pivoting device assigned to the second fitting, a first operating element, upon the actuation of which the two fittings unlock with the use of the transmission element, and a second operating element, upon the actuation of which the first fitting and the free-pivoting device unlock. The driver of the first fitting accommodates the transmission element-which is coupled thereto for carrying along therewith, wherein an empty travel is provided in one direction of rotation between the driver and the transmission element.

In the case of vehicle seats with a back rest, a seat substructure, a free-pivoting device and with fittings of a fitting system that are designed as discontinuous latching fittings, arrangements are known in which a classic latching fitting is used on a first outer side of the vehicle seat and a latching fitting, supplemented by a free-pivoting function, is used on the second outer side of the vehicle seat. While the two latching fittings are opened in order to adjust an angle of inclination of the back rest within an angular range of possible use positions of the back rest and are closed again after the desired angle is fixed, in order to freely pivot the back rest only the free-pivoting device and the latching fitting located on the outer side of the vehicle seat that faces away from the free-pivoting device is opened. By this means, the latching fitting on the side assigned to the free-pivoting device remains in its set use position, and therefore the latter is automatically set again after the pivoting-back action.

In the case of vehicle seats which are known from the prior art and have such fitting systems, a second operating element, which is fastened to the back rest and firstly acts directly on a part of the free-pivoting device that is likewise arranged on the back rest and secondly has to be transferred to a fitting unlocking means, which is generally mounted on the seat substructure, is actuated in order to open at least one of the fittings. Since, in such an embodiment, the fitting which is not assigned to the free-pivoting action also has to be kept open during the free-pivoting movement of the back rest, the unlocking movement of the second operating element has to be transmitted continuously from a movable part (the back rest) to an immovable part (the seat substructure) without the magnitude of the operating stroke being changed or the force flux being disadvantageously influenced in the process. Very frequently, in order to meet this function, classic Bowden cables are arranged between the parts moving relative to one another, in order to transmit the stroke movement. In many applications, such connections completely satisfy the problem posed. Nevertheless, there are boundary conditions in which the use of Bowden cables is highly disadvantageous, and therefore there is a need for an actuating device which can transmit a stroke movement from a first part to a second part, which parts execute a pivoting movement with respect to each other.

SUMMARY OF THE INVENTION

The invention is based on the problem of improving an actuating device, in particular for a fitting system of the type mentioned at the beginning. In addition, a universal actuating device for adjustable vehicle seats is intended to be made available. In particular, an actuating device for transmitting operating or control movements between seat parts moving in a rotatary manner with respect to one another, with the rotational movement of the seat parts being compensated for, is intended to be provided.

The invention is also based on the problem of providing a corresponding vehicle seat with an actuating device according to the invention.

A component should be understood as meaning mechanisms, such as, for example, seat rails, but also structural parts which are movable relative to one another, and also kinematic parts which are movable relative to one another, or a kinematic part which is movable relative to a structural part.

The problem is in a preferred embodiment of the invention with the aid of an actuating device which is embodied in particular as a cable mechanism. The actuating device essentially has two roller-like segments, a deflecting element embodied as a deflecting pulley and a transmission means embodied as a cable or strap.

By arrangement of a coupling lever on a second segment of the actuating device, the rotational movement of said segment is converted again into a stroke movement, and therefore even mechanisms which are actuable by means of a linear stroke (for example rail locks, rotary latch locks, catches, etc.) can be actuated by means of the actuating device.

The actuating lever can be kinematically coupled to a second part which is pivotable about the first axis relative to the first part. Can be kinematically coupled should be understood as meaning, for example, a rotatable connection by means of a rotary joint. The first part can be a fitting lower part and the second part can be a fitting upper part of a back rest adjustment fitting. The first part can be a seat rail, in particular upper rail, of a vehicle seat, and the second part can be a seat part, in particular a seat cushion structure, of the vehicle seat.

The actuating lever can be kinematically coupled to a third part which is connected to the second part so as to be rotatable about an axis of rotation, wherein the axis of rotation between the second part and the third part is preferably aligned with the second axis in the unactuated state of the actuating device. The first part can be a seat rail, in particular upper rail, of a vehicle seat, the second part can be a link which is coupled to the seat rail, and the third part can be a seat part, in particular a seat cushion structure, of the vehicle seat.

The operating characteristics of the actuating device can be designed within a very wide range by the deflecting element not being coupled directly to the actuating lever, but rather being mounted on a coupling lever which is coupled to the actuating lever. By varying the lengths of the actuating lever and of the coupling lever, different transmission ratios and operating force characteristics can be realized. The coupling lever preferably has two ends, wherein a first end is coupled pivotably to the actuating lever and a second end has the deflecting element and is in particular mounted rotatably.

The first segment can be curved about the first axis. The second segment can be curved about the first axis. The first segment and the second segment preferably each have a surface which is curved about the first axis and via which the transmission means rolls between the first part and the second part during pivoting.

The actuating device can be at least partially arranged in a housing. The housing can be fastened to the first part or to the second part of the component. The housing preferably has one or more openings, for example for connecting the first segment to the first part and/or for leading out the actuating lever.

The actuating device can serve for actuating a fitting system. The fitting system preferably comprises a first fitting and a second fitting, wherein the second fitting has an additional free-pivoting device. The two fittings are preferably designed as latching fittings. The fitting system can serve, for example, for a pivotable connection of a back rest to a seat substructure. If the two fittings are unlocked, then (with the free-pivoting device locked) the angle of inclination of the back rest can be changed within a comfort adjustment range. When the first fitting is unlocked and the free-pivoting device of the second fitting is unlocked, the back rest can be pivoted forward without a relative angular position between a first fitting part and a second fitting part of the second fitting being adjusted. Memorization of the free-pivoting function is thereby achieved.

The deflecting element is preferably mounted so as to be rotatable about the deflection axis (second axis). By means of the rotatable mounting, friction forces can be reduced and the efficiency of the actuating device is increased.

The deflecting element is preferably supported by an actuating lever. In particular, the deflecting element can be mounted on the actuating lever so as to be rotatable about the second axis. The actuating lever can be mounted rotatably about a lever axis of rotation. The actuating lever can be connected to the second fitting part or to a fitting upper part or to a part connected to the fitting upper part, for example a back rest, so as to be rotatable about the lever axis of rotation. All of the connections of parts of the actuating device may also take place indirectly via a housing of the actuating device. In the case of fittings with a free-pivoting device, the actuating lever can be connected to a fitting upper part, so as to be rotatable about the lever axis of rotation, wherein, when the free-pivoting device is unlocked, the fitting upper part is pivotable about the back rest axis of rotation (first axis) relative to the assigned locked fitting, and therefore relative to the second fitting part thereof. Actuation of the actuating lever brings about rotation of the actuating lever about the lever axis of rotation. As a result, the distance between the deflecting axis (second axis) and the back rest axis of rotation (first axis) can be changed to a limited extent.

The first axis, the lever axis of rotation and the deflecting axis preferably form the corner points of an imaginary triangle, the inside angles of which are changeable by actuation of the actuating lever, in particular a relative movement of the deflecting axis. Such an arrangement permits a simply constructed actuating device.

The deflecting element is preferably a cable, a strap, a belt, a toothed belt or a chain. A first end region of the transmission means can be fastened to the first segment. A second end region of the transmission means can be fastened to the second segment. However, the invention is not restricted to fastening the transmission means at the end regions thereof. In addition, multi-part transmission means are also conceivable.

In other words, the problem in a preferred embodiment of the invention can be solved with the aid of a cable mechanism which essentially consists of two roller-like segments, a deflecting element embodied as a deflecting pulley and a transmission means embodied as a cable or strap.

The problem is also solved by a vehicle seat with an actuating device according to the invention. The vehicle seat preferably has a seat substructure, a back rest and a fitting system. The back rest can be connected to the seat substructure by means of the fitting system, and the actuating device can serve to actuate the fitting system, wherein the fitting system in particular permits the back rest to pivot freely.

The fitting system of the vehicle seat preferably has at least one fitting with a first fitting part and a second fitting part. The first fitting part and the second fitting part can be lockable to each other and, in an unlocked state, are rotatable about a back rest axis of rotation relative to each other. The first segment of an actuating device according to the invention can be kinematically coupled to the first fitting part, in particular to a fitting lower part which is fixedly connected to the first fitting part. The second segment of the actuating device can be connected to a locking device of the fitting, in particular to a transmission element aligned with the back rest axis of rotation, for rotation therewith or can be coupled thereto for carrying along therewith. The transmission element is preferably a profiled shaft which in particular engages in a driver, which has a mating profile, of a fitting, embodied as a latching fitting, for rotation therewith.

The actuating device can advantageously also be used in a vehicle seat which has a seat rail arrangement, a seat part which is pivotable about the first axis relative to the seat rail arrangement and a locking device for locking the seat rail arrangement. The actuating device can serve here for unlocking the locking device, wherein the first segment is kinematically coupled to a rail profile, in particular to an upper rail of the seat rail arrangement, and the actuating lever is kinematically coupled to the seat part. As a result, for the locking of the seat rail arrangement, the actuating lever can be fastened to the seat part, which is pivotable relative to the seat rail arrangement, and therefore said seat part can be readily ergonomically reached by a seat occupant.

In addition, the actuating device can advantageously be used in a vehicle seat which has height adjustment kinematics with a front link and a rear link, by means of which a seat part is height-adjustable relative to a seat rail arrangement and/or to a vehicle floor, wherein the first segment is kinematically coupled to a rail profile of the seat rail arrangement and the actuating lever is kinematically coupled to the seat part. As a result, for the locking of the seat rail arrangement, the actuating lever can be fastened to the seat part, which is height-adjustable relative to the seat rail arrangement, and therefore said seat part can be readily ergonomically reached, and always at a same distance, by a seat occupant. The front link is preferably coupled firstly to the rail profile so as to be rotatable about the first axis and is coupled secondly to the seat part so as to be rotatable about an axis of rotation, wherein the axis of rotation is aligned with the second axis in the unactuated state of the actuating device.

The invention is explained in more detail below with reference to advantageous exemplary embodiments which are illustrated in the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a perspective view showing a fitting system known from the prior art for a vehicle seat illustrated in FIG. 1a;

DESCRIPTION OF THE PREFERRED EMBODIMENTS

Figure 1:
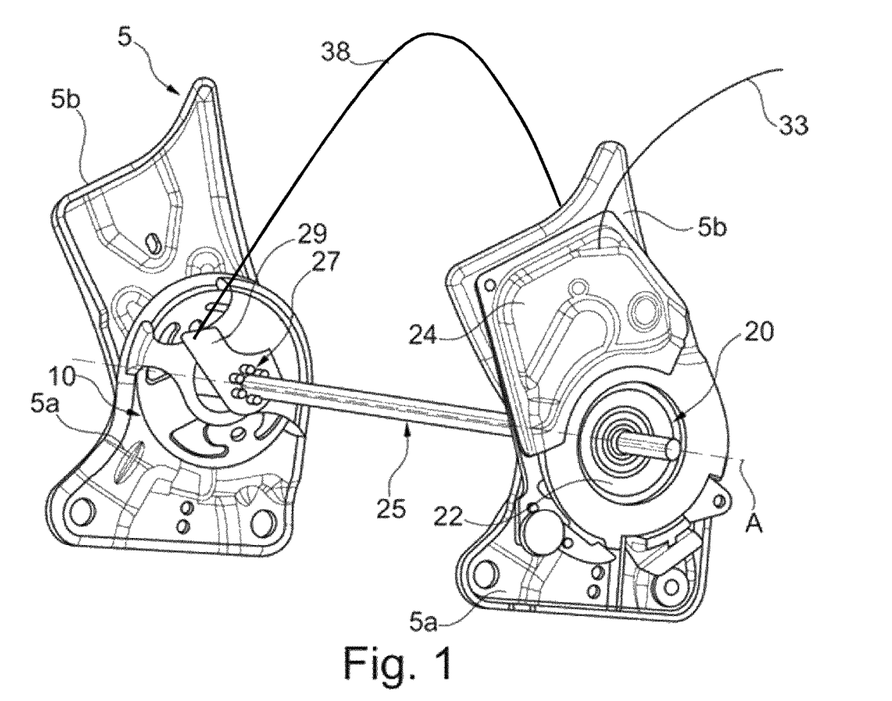

Referring to the drawings, FIG. 1 shows a fitting system 5, which is known from the prior art, for example from WO 2009/143999 A1, for a vehicle seat 1. The vehicle seat 1 is illustrated schematically in FIG. 1a. The fitting system 5 comprises a first fitting 10 and a second fitting 20, which, for unlocking purposes, each have a driver which is rotatable about a first axis A, in the present case a back rest axis of rotation A, a transmission element 25, which is designed as a profiled shaft, between the two fittings 10, 20, a free-pivoting device 24 assigned to the second fitting 20, a first operating element 31, upon the actuation of which the two fittings 10, 20 using the transmission elements 25 are unlocked, and a second operating element 32, upon the actuation of which the first fitting 10 and the free-pivoting device 24 are unlocked. The driver of the first fitting 10 accommodates the transmission element 25, which is coupled thereto for carrying along therewith, wherein an empty travel is provided between the driver and the transmission element 25 in one direction of rotation. Rotation of the respective driver in an opening direction of rotation unlocks the respective fitting 10, 20.

Figure 1A:
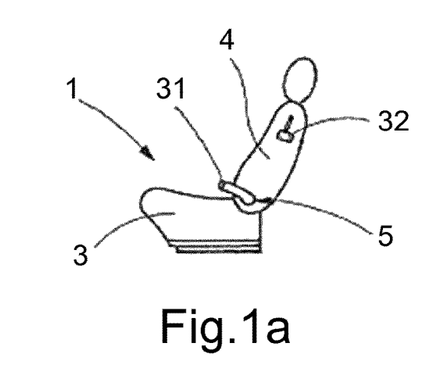
FIG. 1a is a schematic side view of a vehicle seat known from the prior art.

The vehicle seat 1 has a seat substructure 3, a back rest 4, the fitting system 5, the first operating element 31 and the second operating element 32. A fitting lower part 5a which is fastened to a first fitting part of the first fitting 10 connects the first fitting 10 to the seat substructure 3, while a fitting upper part 5b which is fastened to a second fitting part of the first fitting 10 connects the first fitting 10 to the back rest 4. In an unlocked state of the first fitting 10, the first fitting part and the second fitting part are rotatable about the back rest axis of rotation A relative to each other. In the present case, the fitting lower part 5a is fixedly connected to the first fitting part of the first fitting 10. In the present case, the fitting upper part 5b is fixedly connected to the second fitting part of the fitting 10. The first fitting 10 and the second fitting 20 are arranged on opposite sides of the vehicle seat, as viewed in the transverse direction.

The second fitting 20 likewise has a first fitting part and a second fitting part, which are lockable to each other and, in an unlocked state, are rotatable about the back rest axis of rotation A. The first fitting part of the second fitting 20 is likewise fastened to a fitting lower part 5a. The fitting lower part 5a is fastened to the seat substructure 3. However, the fitting upper part 5b which is connected to the back rest 4 is mounted rotatably on the second fitting 20, in the present case is mounted rotatably on the second fitting part 22 thereof, and is lockable to the second fitting part 22 by means of a locking device of the free-pivoting device 24. The free-pivoting device 24 which is assigned to the second fitting 20 is defined by the locking device and the modification of the fitting upper part 5b and optionally of the second fitting part 22 of the second fitting 20. In an unlocked state of the free-pivoting device 24, the free-pivoting device 24 permits the fitting upper part 5b to pivot relative to the locked second fitting 20. The basic design of a free-pivoting device 24 of this type is known for a geared fitting, for example from DE 10 2006 044 490 A1.

The first operating element 31 sits-axially outside the two fittings 10 and 20—on the transmission element 25 for rotation therewith or subjects the latter to a torque. The first operating element 31 is preferably a first hand lever which is connected on an outer side of the vehicle seat 1 to the transmission element 25 for rotation therewith. If the first operating element 31 is actuated, in particular is pivoted upward, the transmission element 25 rotates about the first axis A. As a result, in the two fittings 10, 20, a driver is carried along, and the two fittings 10, 20, which are designed as latching fittings, are thereby unlocked. The back rest 4 can then be pivoted into a different use position. When the desired new inclination of the back rest 4 is reached, the first operating element 31 is released, after which a spring rotate the driver and the transmission element 25 back, and therefore the two fittings 10, 20 are locked again.

A second operating element 32, preferably a second hand lever, is preferably arranged in the upper region of the back rest 4 and is operatively connected by means of a first cable pull 33 to the free-pivoting device 24 assigned to the second fitting 20, more precisely to a free-pivoting lever which sits on an unlocking shaft of the free-pivoting device 24 for rotation with said unlocking shaft. As can be seen in FIG. 1, the free-pivoting lever in turn is operatively connected by means of a second cable pull 38 to an unlocking lever 29 of the first fitting 10. If the second operating element 32 is actuated, firstly the free-pivoting lever is therefore pivoted and the free-pivoting device 24 thereby unlocked and secondly the unlocking lever 29 is pivoted. The pivoting unlocking lever 29 rotates a lever element 27 which, for its part, rotates the driver of the first fitting 10, and therefore the first fitting 10 is unlocked. Since the driver of the first fitting 10 is then rotated the other way around relative to the transmission element 25, the empty travel is traversed, i.e. the transmission element 25 remains unrotated in its starting position. As a result, the driver of the second fitting 20 also remains unrotated, and therefore the second fitting 20 remains locked. With the unlocked first fitting 10 and the unlocked free-pivoting device 24, the back rest 4 can be freely pivoted forward. If the back rest 4 is pivoted back and the previously adopted use position reached, the free-pivoting device 24 locks, as a result of which the free-pivoting lever is pivoted back, and therefore the driver of the first fitting 10 can rotate back and therefore the first fitting 10 is locked again.

The second operating element 32, the first cable pull 33 and the second cable pull 38 are fastened to the back rest 4. When the back rest 4 is pivoted, the second operating element 32 is pivoted at the same time, whereas the transmission element 25 is not pivoted at the same time. The first cable pull 33 and the second cable pull 38, on account of their flexibility, compensate for this relative movement between the second operating element 32 and the transmission element 25.

Figure 2:
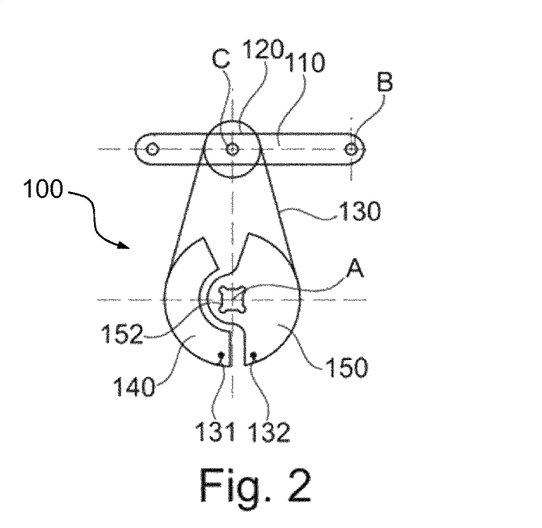
FIG. 2 is a schematic view showing a first exemplary embodiment of an actuating device according to the invention in an unactuated state.
Figure 3:
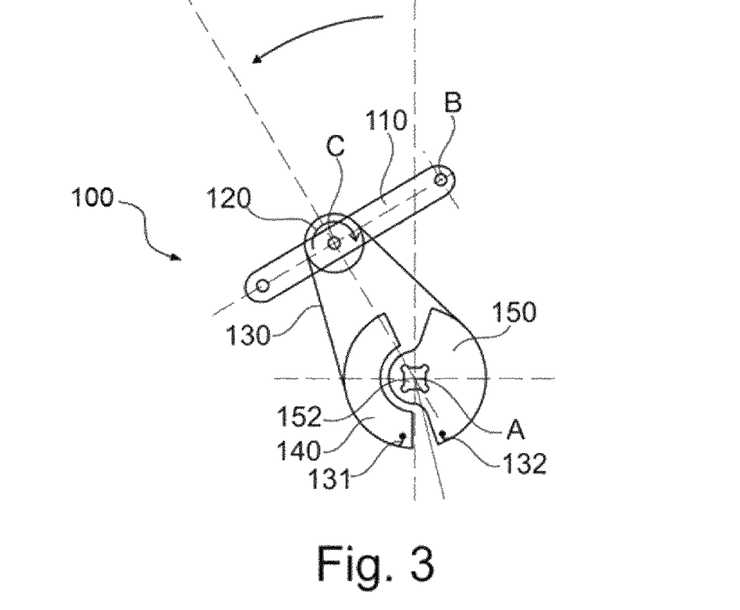
FIG. 3 is a schematic view showing the actuating device from FIG. 2 in a state partially pivoted about a first axis.
Figure 4:
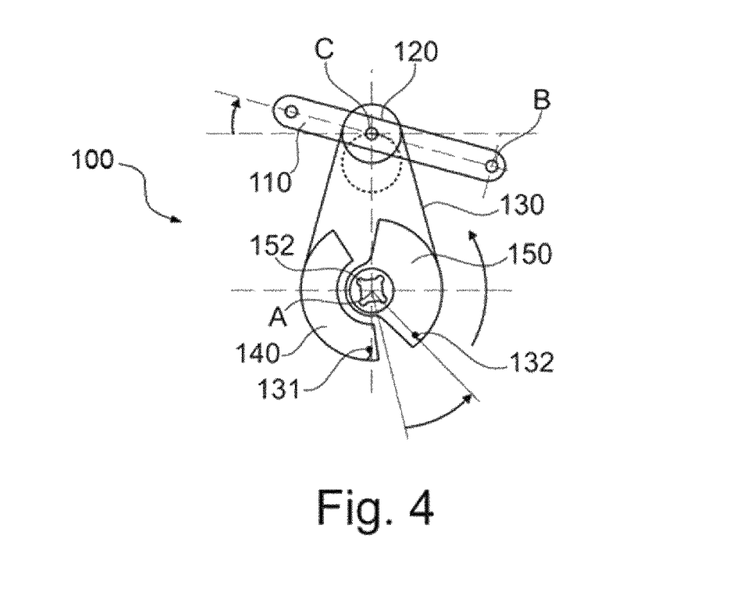
FIG. 4 is a schematic view showing the actuating device from FIG. 2 in an actuated state.

FIGS. 2 to 4 illustrate a first exemplary embodiment of an actuating device 100 according to the invention for a fitting system, in particular for a modification of the previously described fitting system 5 known from the prior art. Use of the actuating device 100 in conjunction with the known fitting system 5 can replace the second cable pull 38 thereof, the lever element 27 and the unlocking lever 29.

The actuating device 100 is arranged on the second fitting 20. The actuating device 100 comprises a deflecting element 120, which is rotatable about a second axis, a deflecting axis C, is movable to a limited extent with respect to the fitting upper part and is coupled to the fitting upper part, a first segment 140 which is rigidly connected at least indirectly to the fitting lower part 5*a*, a second segment 150, which is rotatable about the first axis A and is connected to the transmission element 25 for rotation therewith or is coupled thereto for carrying along therewith, and a flexible transmission means 130.

The transmission element 25 has a splined shaft profile in cross section. The second segment 150 has an opening 152 with a mating profile which is complementary to the splined shaft profile of the transmission element 25, and therefore the transmission element 25 can be pushed through the opening 152 in the axial direction, in particular for installation purposes. However, the second segment 150 is connected to the transmission element 25 for rotation therewith—optionally after traversing a free wheel—in the circumferential direction, in the present case in both directions of rotation.

The first operating element 31 is connected to the driver of the second fitting 20 for rotation with said driver, and therefore actuation of the first operating element 31 directly rotates the driver of the second fitting 20 and opens the second fitting 20. The driver of the second fitting 20 has a bore with a mating profile which is complementary to the splined shaft profile of the transmission element 25, wherein the mating profile is configured in such a manner that the driver of the second fitting 20, upon its rotation in the opening direction, carries along the transmission element 25, but, when the transmission element 25 is driven in the same direction of rotation by means of the second segment 150, a free wheel is effective between the transmission element 25 and the driver. The free wheel can be designed as play in the circumferential direction between the splined shaft profile of the transmission element 25 and the complementary mating profile of the bore of the driver of the second fitting 20.

The outer contours of the first segment 140 and of the second segment 150, over which the transmission element 130 in each case rolls, are in each circumferential portions of an imaginary circle about the first axis A (identical to the back rest axis of rotation in this exemplary embodiment). The distance between the deflecting axis C (second axis) and the back rest axis of rotation A can be changed to a limited extent. A first end region 131 of the transmission element 130 is fastened to the first segment 140. A second end region 132 of the transmission element 130 is fastened to the second segment 150. The transmission means 130 runs over the deflecting element 120 in such a manner that, when the deflecting element 120 rotates about the first axis A, the transmission means 130 rolls over the deflecting element 120, the first segment 140 and the second segment 150, and therefore the second segment 150 is not rotated about the first axis A or not rotated thereabout to an extent such that the first fitting 10 is unlocked. When the distance between the first axis A and the deflecting axis C changes, the second segment 150 is rotated by means of the transmission means 130 about the first axis A (back rest axis of rotation) to an extent such that the first fitting 10 is unlocked.

The essential elements of the actuating device 100 are only illustrated schematically in FIGS. 2 to 4. Arranged in the upper region of the actuating device 100 is an actuating lever 110 which is mounted in an end region of the actuating lever 110 by means of a lever axis of rotation B. In the present case, the lever axis of rotation B is mounted rotatably on the fitting upper part 5*b* of the second fitting 20 and therefore on the back rest 4. Approximately halfway along the actuating lever 110, the deflecting element 120, which is designed as a deflecting roller, is mounted in alignment with the deflecting axis C. When an unlocking movement is initiated, the actuating lever 110 is pivoted about the lever axis of rotation B, in the present case by actuation of the second operating element 32 which is connected to the actuating lever 110 via a cable pull.

The transmission means 130, embodied as a cable or strap, is deflected about the deflecting element 120. The first end region 131 of the transmission means 130 is fixedly connected to the immovable first segment 140 which is fixed to the seat substructure and has an outer contour which is curved about the back rest axis of rotation A. The second end region 132 of the transmission means 130 loops around the second segment 150 which is designed as a rotatable roller segment and the center point of which—like the center point of the first segment—coincides with the back rest axis of rotation A. This second segment 150 has centrally an opening 152 as a carry-along profile which can drive the transmission element 25 in a rotating manner.

While FIG. 2 illustrates the actuating device 100 in an inoperative position, FIG. 3 shows the behavior of the actuating device 100, which is designed as a cable pulley mechanism, while the back rest 4 is being pivoted forward. When the actuating device 100 is used for actuating a fitting system 5 described at the beginning, FIG. 2 corresponds to a state in which the free-pivoting device 24—and therefore the actuating lever 110 supporting the deflecting element 120—is not actuated, but rather the two fittings (10, 20) are unlocked for a comfort adjustment, and therefore the desired back rest angle can be set. FIG. 3 reveals that the entire unit consisting of actuating lever 110 and deflecting element 120 pivots about the back rest axis of rotation A, the transmission means 130 is unwound from the first segment 140 and is wound up onto the second segment 150 without rotating the second segment 150. Expressed in other words, the contact regions between the transmission means 130 and the first segment 140 and the second segment 150 change during the pivoting about the back rest axis of rotation A.

In the present case, the radii of the first segment 140 and of the second segment 150 are identical in size, and therefore the total looping-around angle of the transmission means 130 embodied as a strap does not change. As a result, the relative position between the second segment 150 and the first segment 140 remains identical, and, during pivoting of the deflecting element 120 about the back rest axis of rotation A, the transmission means 130 only changes its relative position in space without exerting other effects on the parts which are not pivoted.

FIG. 4 shows the relative movements of parts of the actuating device 100 upon actuation of the actuating lever 110, typically for unlocking the free-pivoting device 24 and freely pivoting the back rest 4. During this movement, the distance between the back rest pivot axis A and the deflecting axis C of the deflecting element 120 designed as a deflecting pulley changes, and therefore, because of the fixed connection of the transmission means 130 to the fixed first segment 140, the second end region 132 of the transmission means 130 is inevitably moved and the latter consequently brings about the desired pivoting movement of the second segment 150 and of the transmission means 130 which is made contact with for carrying along in this pivoting direction. The associated first fitting 10 is thereby unlocked, the back rest 4 becomes pivotable and the mechanism can now in turn be pivoted, with the lever position being maintained, about the back rest axis of rotation A without the relative position between the first segment 140 and the second segment 150 changing.

Figure 5:
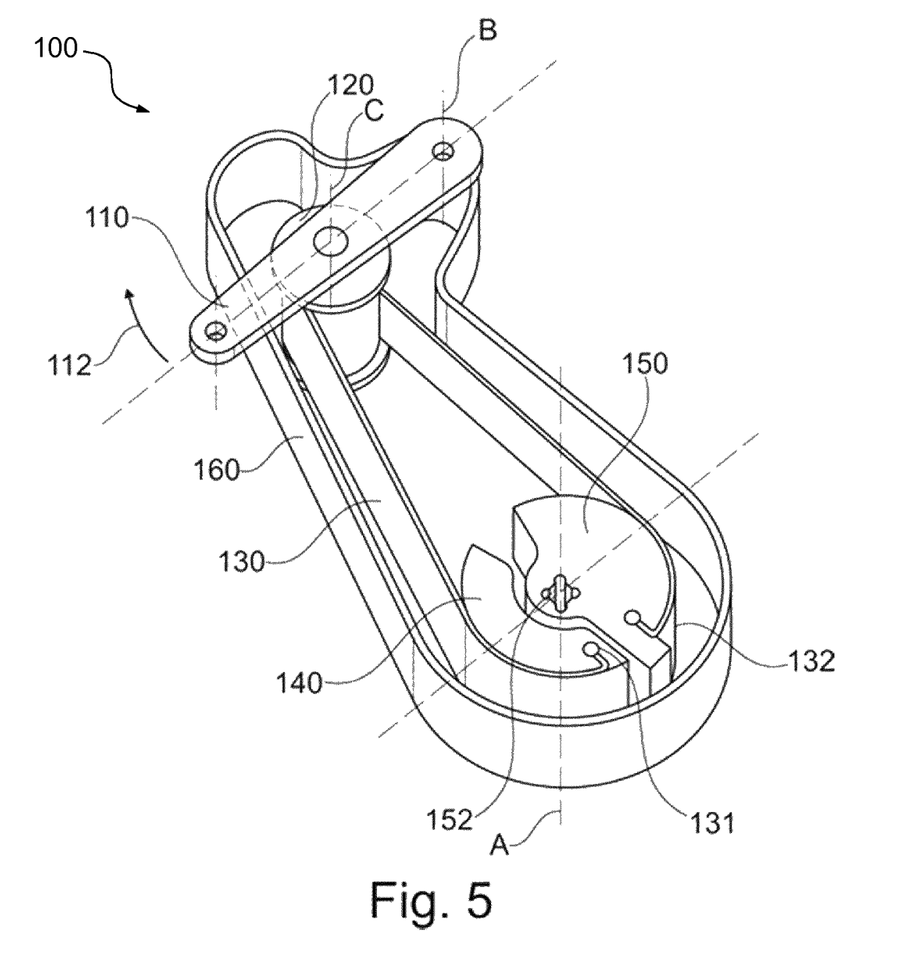
FIG. 5 is a schematic view showing a second exemplary embodiment of an actuating device according to the invention.

The actuating device 100 which is only schematically illustrated and explained in FIGS. 2 to 4 can be embodied in diverse structural variations. FIG. 5 shows a second exemplary embodiment in which the above-described mechanism of the actuating device 100 of the first exemplary embodiment is mounted in a housing 160. The housing 160 can be fastened to a first part, in the present case to the fitting upper part 5b or to the back rest 4. The first segment 140 can be fixedly connected to a second part, in the present case to the fitting lower part 5a or the seat substructure 3, via an opening hole (not illustrated in FIG. 5) in the housing 160.

Figure 6:
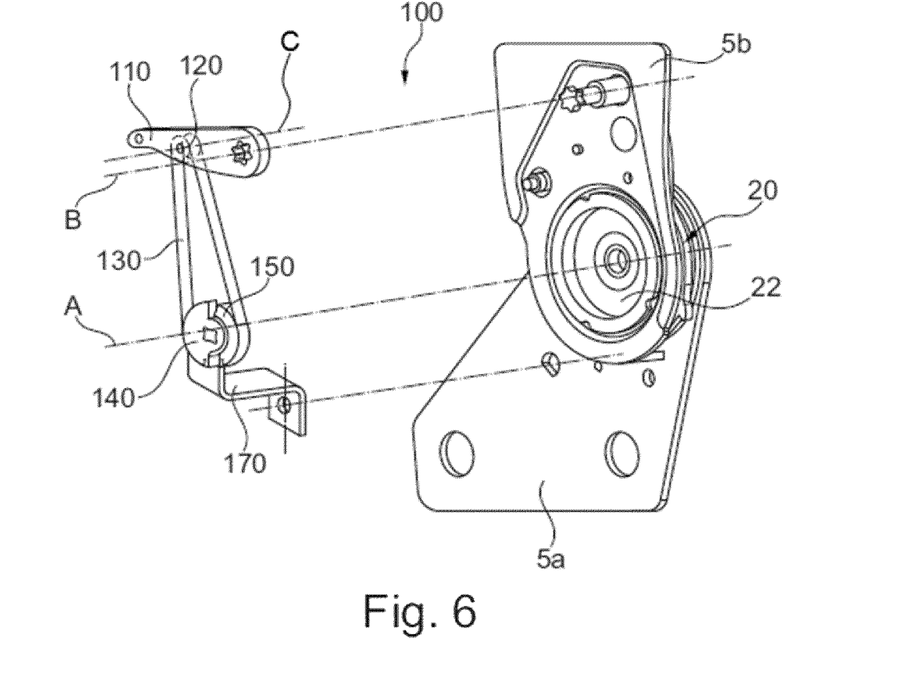
FIG. 6 is a schematic perspective view showing a third exemplary embodiment of an actuating device according to the invention and also a fitting of a fitting system.

FIG. 6, as a third exemplary embodiment, shows by way of example an exemplary arrangement of a second fitting 20 with a free-pivoting device 24 and an actuating device 100. A bent holding part 170 serves to connect the first segment 140 to the fitting lower part 5a. The actuating lever 110 is connected to an unlocking shaft of the free-pivoting device 24 for rotation with said unlocking shaft. The unlocking shaft of the free-pivoting device 24 is therefore aligned with the lever axis of rotation B, and therefore actuation of the actuating lever 110 unlocks both the free-pivoting device 24 and the first fitting 10.

In a typical use of the actuating device 100, the arrangement and design of the connecting elements between the first operating element 31 for the comfort adjustment of the fittings (10, 20), the fitting unlocking elements and the transmission element 25 is realized in such a manner that, when the comfort adjustment is actuated, both the second fitting 20, which is assigned to the free pivoting, and the transmission element 25 (for unlocking the first fitting 10) are actuated, whereas, when actuation takes place via the cable roller mechanism, only the first fitting 10 is unlocked by means of the transmission element 25. The specific design can be realized by use of the free-wheeling function described at the beginning in the respective carry-along profiles. The mating profile of the second segment 150 can interact with play in the circumferential direction with the splined shaft profile of the transmission element 25 in such a manner that the transmission element 25 can be actuated by the first operating element 31 without rotating the second segment 150. Actuation of the second operating element 32 and resulting rotation of the second segment 150 lead, by contrast, directly to rotation of the transmission element 25 and therefore to unlocking of the first fitting 10. In a modification of the exemplary embodiment, a connection between the second segment 150 and the transmission element 25 for conjoint rotation is provided, i.e. without a free wheel. The transmission element 130 then takes over the decoupling function counter to the customary loading direction (tensile loading).

As illustrated in FIG. 6, the actuating device 100 can be arranged on the inner side of the back rest 4, but, if required, can also be arranged on an outer side of a back rest. The previously described embodiment, in which the actuating lever 110 supporting the deflecting element 120 is preferably mounted on the axis of a free-pivoting device 24, also only constitutes an exemplary and non-limiting embodiment. In general, the described solution within seats is also conceivable for other uses than the back rest free-pivoting function if the kinematic boundary conditions in respect of rotational movements and mutual actuations are similar to the use described here.

Figure 7:
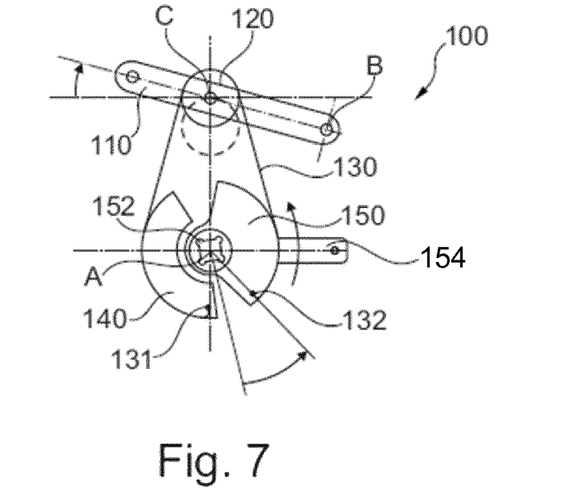
FIG. 7 is a schematic view showing a fourth exemplary embodiment of an actuating device according to the invention.

FIG. 7 shows a fourth exemplary embodiment of an actuating device 100 according to the invention which, with the exception of the differently described features, corresponds to the basic principle of the exemplary embodiments shown in FIGS. 2 to 6. A coupling lever 154 protrudes in the radial direction from the second segment 150. The coupling lever 154 has an interface, in particular for the connection of a cable pull, Bowden cable or linkage, by means of which the second segment 150 can be coupled to a locking device of a further component of the vehicle seat 1. A further component of the vehicle seat 1 can be, for example, a locking device for a seat rail arrangement. In order to actuate a locking device of a seat rail arrangement, a linear stroke is required. The coupling lever 154 assigned to the actuating device 100 on the output side converts the rotational movement of the second segment 150 into a movement with a superimposed stroke movement. The coupling lever 154 can be a direct part of the second segment 150 and therefore of the actuating device 100. Alternatively, the coupling lever 154, as an additional part which can be used modularly, can be connected in different positions by means of a plug-in or clip connection to an output shaft of the actuating device 100 or to a shaft connected to the second segment 150, for example to the transmission element 25.

Figure 8:
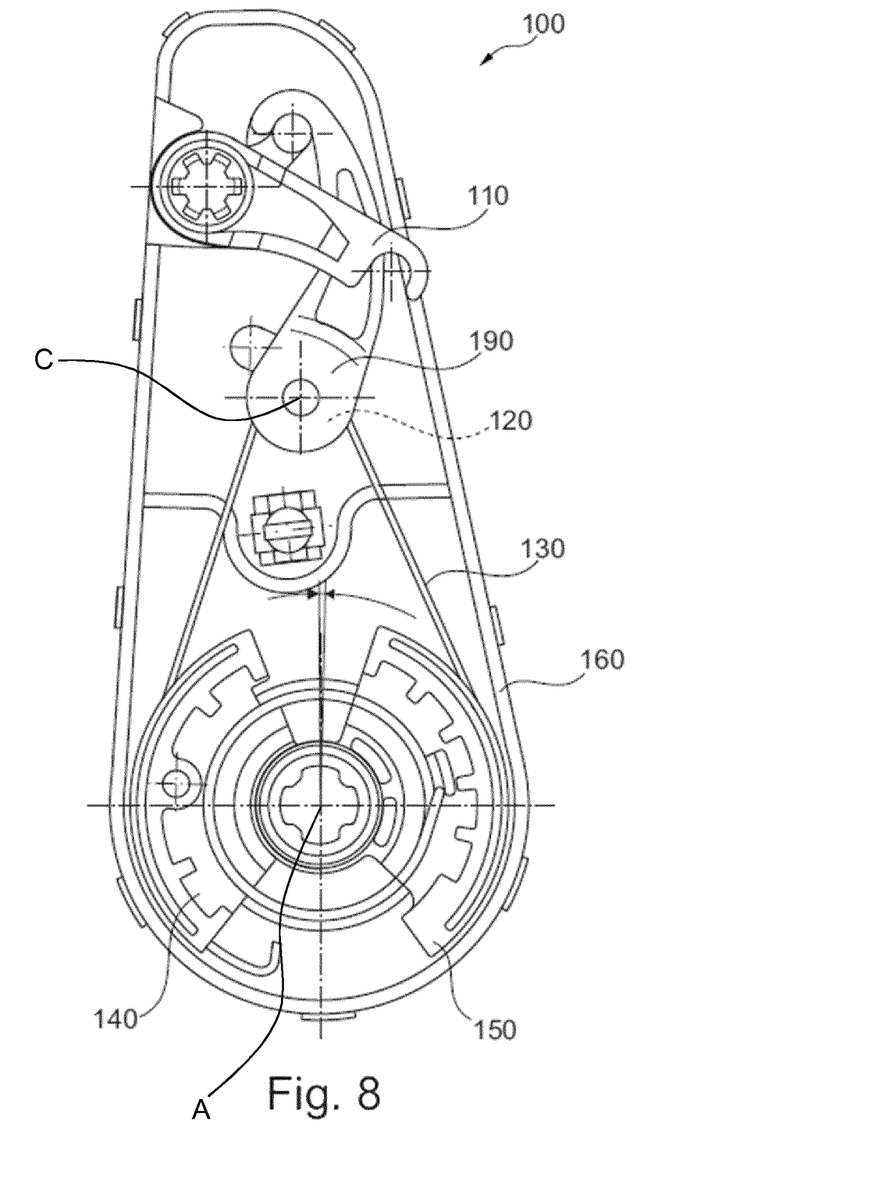
FIG. 8 is a schematic view showing a fifth exemplary embodiment of an actuating device according to the invention.

FIG. 8 shows a fifth exemplary embodiment of an actuating device 100 according to the invention which, with the exception of the differently described features, corresponds to the basic principle of the exemplary embodiments shown in FIGS. 2 to 7.

In order to optimize the overall function of the actuating device 100 of the fifth exemplary embodiment, in particular of the ratio of an input stroke on the actuating lever 110 to an output stroke of the second segment 150 and in order to reduce tolerance sensitivity in an overstroke region, a coupling lever 190 is provided. The coupling lever 190 has two ends. A first end of the coupling lever 190 is arranged pivotably on the input-side actuating lever 110. A second end of the coupling lever 190 has the deflecting element 120. The kinematic arrangement is selected in such a manner that a stroke transmitted to the deflecting element 120 becomes non-linearly smaller in relation to the actuating angle of the actuating lever 110, and therefore, firstly, the tolerances have less effect in the end position and, secondly, the actuating moments, which customarily increase in the actuated locking devices during the rotation of the second segment 150, lead toward the end of the stroke to an actuating moment of the actuating lever 110 that is smaller, as viewed in relative terms, and therefore more comfortable. Furthermore, by means of this arrangement, the effective overall length of the transmission means 130 (for example of a cable or of a strap) is reduced in comparison to an embodiment without a coupling lever, as a result of which elasticities and extensions, caused, for example, by the effect of temperature, are reduced.

Figure 9:
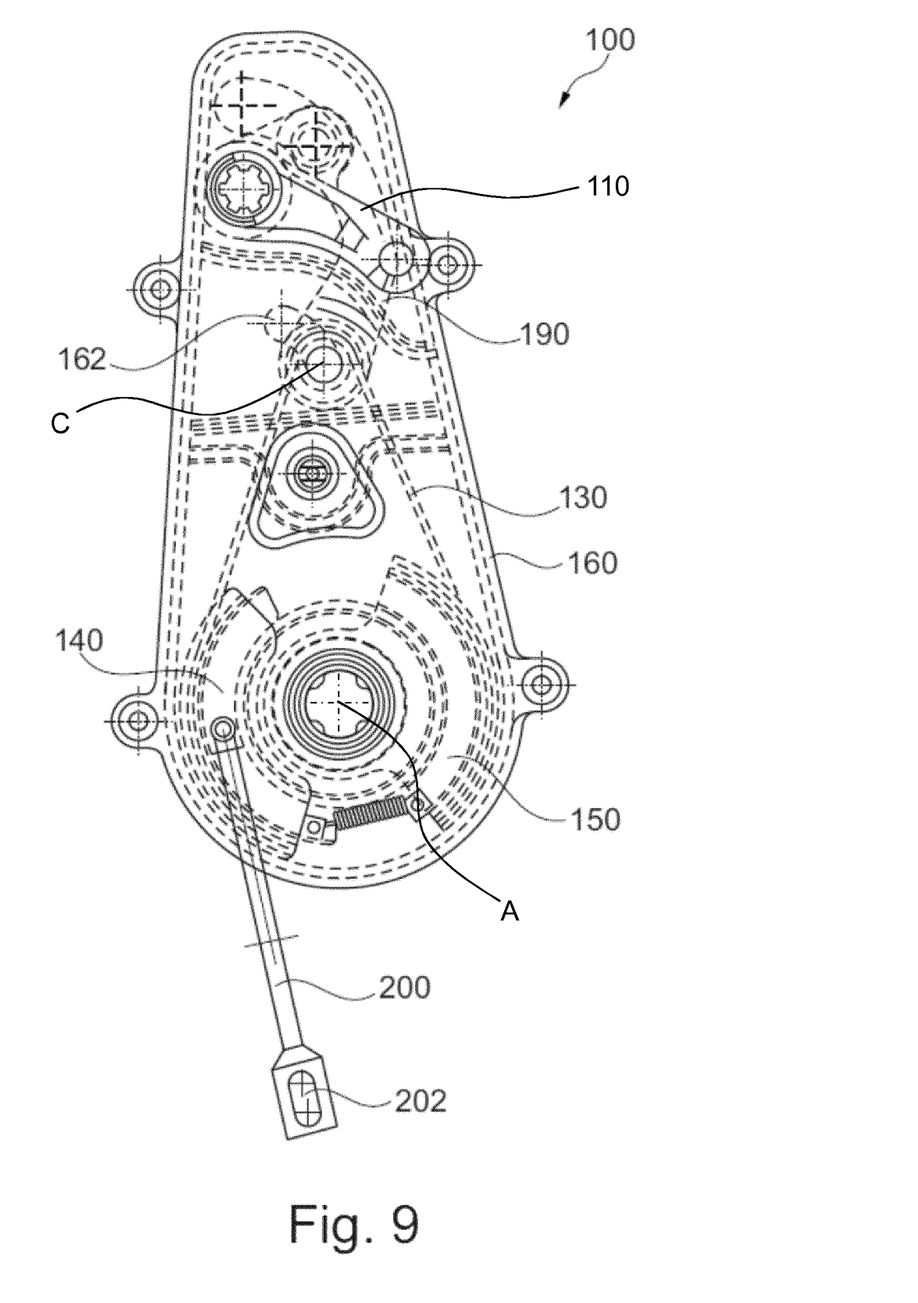
FIG. 9 is a schematic view showing a sixth exemplary embodiment of an actuating device according to the invention.

FIG. 9 shows a sixth exemplary embodiment of an actuating device 100 according to the invention which, with the exception of the differently described features, corresponds to the basic principle of the fifth exemplary embodiment which is illustrated in FIG. 8. A linkage 200 is provided for the non-rotatable connection of the first segment 140 to a positionally fixed first part of a component, for example to a fitting lower part 5a or to a rail profile of a seat rail. The linkage 200 has two ends. A first end of the linkage 200 is coupled to the first segment 140. A second end of the linkage 200 can be coupled to the first part of the component or to a further part, for example a seat lower part, which is fixedly connected to the first part of the component. To compensate for tolerances during the installation of the actuating device 100 or during the arrangement of the actuating device 100 on a component, an elongated hole 202 is provided in the second end of the linkage 200. As is apparent in FIG. 9, in order to restrict the possible movements of the coupling lever 190, a guide 162 is provided in the housing 160 in the region of the deflecting element 120, the guide preventing the coupling lever 190 from swinging freely about an upper connecting axis to the actuating lever 110. An inadvertent movement of the coupling lever 190 in the event of a horizontal acceleration force, acting on the actuating device 100, during the driving mode is therefore avoided.

Figure 10:
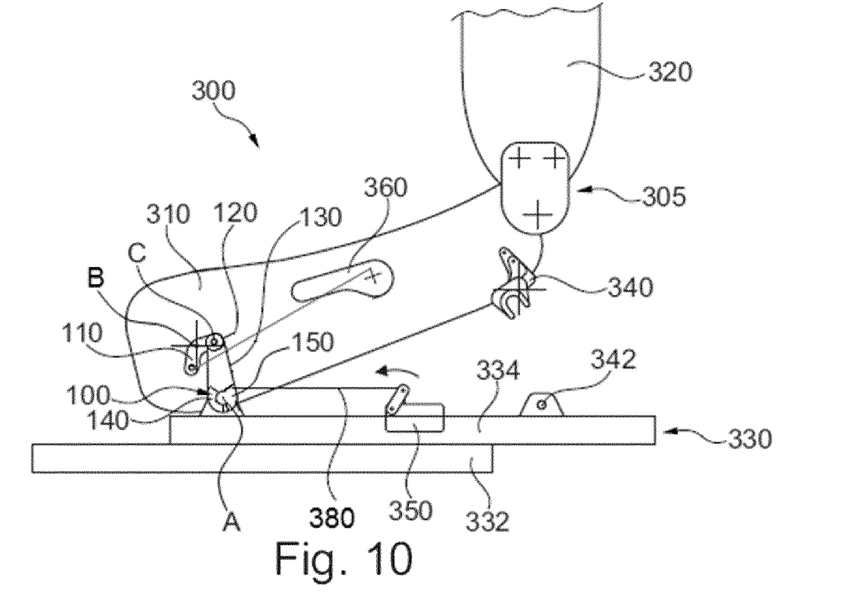
FIG. 10 is a side view in schematized form of a seventh exemplary embodiment in which an actuating device according to the invention is arranged in a vehicle seat which is pivotable about a front pivot point relative to a seat rail arrangement, and serves to actuate a locking device of the seat rail arrangement.

FIG. 10 shows a side view of a seventh exemplary embodiment in which the actuating device 100 according to the invention is arranged in a vehicle seat 300. The vehicle seat 300 has a seat part 310 and a back rest 320 coupled to the seat part 310 by means of a fitting system 305. In a front region of the seat part 310, as viewed in the direction of travel, the seat part 310 is coupled to a seat rail arrangement 330 so as to be rotatable about a first axis of rotation A. In a rear region of the seat part 310, as viewed in the direction of travel, the seat part 310 is lockable to the seat rail arrangement 330 by means of a lock 340. The seat rail arrangement 330 comprises a first rail profile 332, which is connectable to a vehicle structure, and a second rail profile 334 which is guided displaceably on the first rail profile 332. The seat part 310 is coupled to the second rail profile 334 so as to be rotatable about the first axis of rotation A. The second rail profile 334 and the seat part 310 are part of a rotary bearing component. In addition, a mating element 342 for locking with the lock 340 is connected to the second rail profile 334.

The seat rail arrangement 330 has a locking device 350 which can act in a locking manner between the first rail profile 332 and the second rail profile 334. A cable pull 380 connects the locking device 350 to the actuating device 100. A first segment 140 of the actuating device 100 is coupled to the second rail profile 334. A second segment 150 of the actuating device 100 is rotatable about the first axis of rotation A relative to the first segment 140. An actuating lever 110 of the actuating device 100 is coupled rotatably to the seat part 310. The actuating lever 110 is connected to an operating handle 360 which is coupled to the seat part 310 and serves for unlocking the locking device 350.

Actuation of the operating handle 360 leads to pivoting of the actuating lever 110 of the actuating device 100, and therefore the distance between the second axis C and the first axis A is increased. Analogously to the previously described manner of operation of the actuating device 100, the second segment 150 is thereby pivoting about the first axis of rotation A. As a result, the locking device 350 is opened via the cable pull 380.

The lock 340 can be opened with a further operating device (not illustrated in FIG. 10). When the seat part 310 is pivoted about the first axis of rotation A (without actuation of the operating handle 360), the deflecting element 120 is pivoted about the first axis of rotation A, and the transmission means 130 rolls over the deflecting element 120, the first segment 140 and the second segment 150 in such a manner that the second segment 150 is not rotated about the first axis of rotation A. The locking device 350 therefore remains locked.

Figure 11:
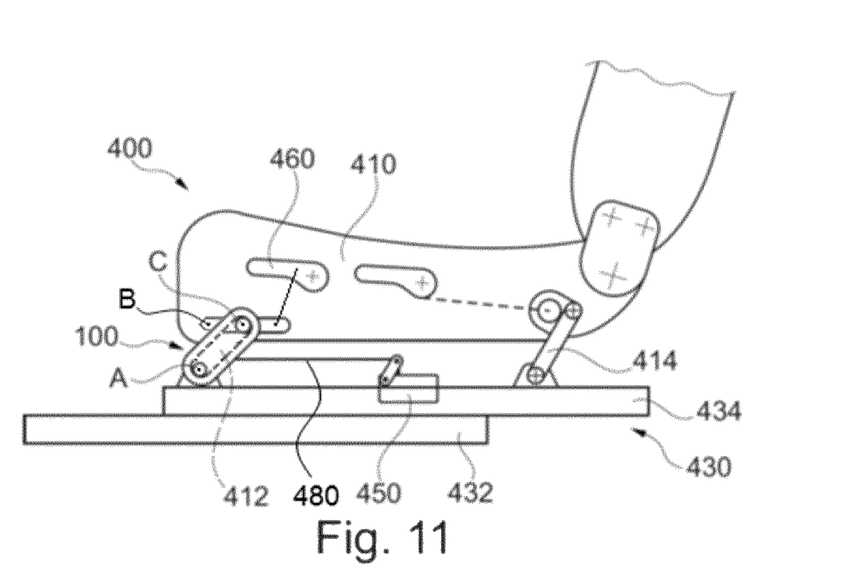
FIG. 11 is a side view in schematized form of an eighth exemplary embodiment in which an actuating device according to the invention is arranged on a four-bar-linkage height adjustment device of a vehicle seat, and serves to actuate a locking device of a seat rail arrangement of the vehicle seat.

A further possible use of the actuating device 100 is shown schematically and in simplified form by FIG. 11 as an eighth exemplary embodiment. The actuating device 100 corresponds here, for example, to the actuating device of the fourth exemplary embodiment and is illustrated in highly schematized form in FIG. 11. A vehicle seat 400 has four-bar linkage height adjustment kinematics which are known per se, with a front link 412 and a rear link 414 by means of which a seat part 410 is height-adjustable relative to a seat rail arrangement 430. The actuating device 100 is arranged in the region of the front link 412. A first axis A of the actuating device 100 is aligned with a lower axis of rotation of the front link 412. In the unactuated state of the actuating device 100, a second axis C (deflecting axis) of the actuating device 100 is aligned with an upper axis of rotation of the front link 412. A second segment of the actuating device 100 is rotatable about the first axis of rotation A. The second segment is operatively connected to a locking device 450 of the seat rail arrangement 430 by means of a cable pull 480 connected to the second segment eccentrically with respect to the first axis A. An actuating lever 110 of the actuating device 100 is coupled rotatably to the seat part 410 and is operatively connected to an operating handle 460. In order to adjust the height of the vehicle seat 400, a locking of the rear link 414 is unlocked and the four-bar linkage height adjustment kinematics are correspondingly moved. The transmission means 130 of the actuating device 100 rolls here over the deflecting element, the first segment and the second segment without the second segment being rotated. Owing to the actuating device 100, the height adjustment position of the four-bar linkage height adjustment kinematics does not have any effect on the operating characteristics of the locking device 450. To open the locking device 450 of the seat rail arrangement 430, the operating handle 460 is actuated and, as a result, the actuating lever 110 is pivoted relative to the seat part 410, and therefore the distance between the second axis C and the first axis A is increased. Since the first segment of the actuating device 100 is fixedly connected to a second rail profile 434 of the seat rail arrangement 430, the second segment rotates as a result and opens the locking device 450 via the cable pull 480.

The features disclosed in the above description, the claims and the drawings may be of importance both individually and in combination for realizing the invention in its various refinements.

Although the invention has been described in detail in the drawings and in the preceding illustration, the illustrations should be understood as illustrative and by way of example and non-limiting. In particular, the choice of the graphically illustrated proportions of the individual elements should not be interpreted as required or restrictive. Furthermore, the invention is in particular not restricted to the exemplary embodiments explained. Further variants of the invention and the realization thereof emerge to a person skilled in the art from the preceding disclosure, the figures and the claims. While specific embodiments of the invention have been shown and described in detail to illustrate the application of the principles of the invention, it will be understood that the invention may be embodied otherwise without departing from such principles.

The invention claimed is:

1. An actuating device for connecting to a vehicle seat component, wherein the component has a first part and a second part which is pivotable about a first axis relative to the first part, the actuating device comprising:
   a first segment which can be coupled kinematically to the first part;
   a second segment which is rotatable about the first axis relative to the first segment and is connectable to a locking device of the component and/or to a locking device of a further component;
   an actuating lever;
   a deflecting element which is coupled to the actuating lever and has a deflecting surface which is curved about a second axis;
   a flexible transmission element, wherein
   a distance between the second axis and the first axis is changeable to a limited extent
   a first region of the flexible transmission element is fastened to the first segment;
   a second region of the flexible transmission element is fastened to the second segment;
   the flexible transmission element runs over the deflecting element
   upon the deflecting element rotating about the first axis, the flexible transmission element is moved over the deflecting element, is moved over the first segment and is moved over the second segment such that the second segment remains unrotated with respect to the first axis; and
   upon the distance between the first axis and the second axis changing, the second segment is rotated about the first axis by the flexible transmission element.

2. The actuating device as claimed in claim 1, wherein the actuating lever is coupled kinematically to the second part or is coupled to a third part which is connected rotatable about an axis of rotation to the second part, wherein the axis of rotation between the second part and the third part is aligned with the second axis in the unactuated state of the actuating device.

3. The actuating device as claimed in claim 1, wherein the deflecting element is mounted on the actuating lever so as to be rotatable about the second axis.

4. The actuating device as claimed in claim 1, wherein the actuating lever is mounted rotatably about a lever axis of rotation.

5. The actuating device as claimed in claim 4, wherein the first axis of rotation, the lever axis of rotation and the second axis, as a deflecting axis, form corner points of an imaginary triangle, with inside angles that are changeable by actuation of the actuating lever.

6. The actuating device as claimed in claim 1, wherein the deflecting element is mounted rotatably about the second axis on a coupling lever which is coupled to the actuating lever.

7. The actuating device as claimed in claim 6, wherein the coupling lever has two ends, wherein a first end is coupled pivotably to the actuating lever and a second end has the deflecting element.

8. The actuating device as claimed in claim 1, wherein the first segment and the second segment each have a surface which is curved about the first axis.

9. A vehicle seat with an actuating device comprising:
   a vehicle seat component, wherein the component has a first part and a second part which is pivotable about a first axis relative to the first part;
   a first segment which can be coupled kinematically to the first part;
   a second segment which is rotatable about the first axis relative to the first segment and is connectable to a locking device of the component and/or to a locking device of a further component;
   an actuating lever;
   a deflecting element which is coupled to the actuating lever and has a deflecting surface which is curved about a second axis;
   a flexible transmission element, wherein
   a distance between the second axis and the first axis is changeable to a limited extent
   a first region of the flexible transmission element is fastened to the first segment;
   a second region of the flexible transmission element is fastened to the second segment;
   the flexible transmission element runs over the deflecting element
   upon the deflecting element rotating about the first axis, the flexible transmission element is moved over the deflecting element, is moved over the first segment and is moved over the second segment such that the second segment remains unrotated with respect to the first axis;
   upon the distance between the first axis and the second axis changing, the second segment is rotated about the first axis by the flexible transmission element.

10. The vehicle seat as claimed in claim 9, further comprising:
   a seat substructure;
   a back rest; and a fitting system, wherein the back rest is connected to the seat substructure by the fitting system, and the fitting system, in an unlocked state, permits the back rest to pivot freely, and the actuating device actuates the fitting system.

11. The vehicle seat as claimed in claim 10, wherein the fitting system comprises at least one fitting with a first fitting part associated with the vehicle seat component and a second fitting part, which first fitting part and second fitting part are lockable to each other and, in an unlocked state, are rotatable relative to each other about a back rest axis of rotation.

12. The vehicle seat as claimed in claim 11, wherein the first segment is coupled kinematically to a fitting lower part of the first fitting part, which fitting lower part is fixedly connected to the first fitting part, and the second segment is connected to a locking device of a transmission element of the at least one fitting, wherein the transmission element is aligned with the back rest axis of rotation, for rotation therewith or is coupled thereto for carrying along therewith.

13. The vehicle seat as claimed in claim 9, further comprising:
 a seat rail arrangement; and
 a seat part pivotable about the first axis relative to the seat rail arrangement, wherein:
 the locking device of the further component locks the seat rail arrangement;
 the actuating device unlocks the locking device of the further component;
 the first segment is kinematically coupled to a rail profile of the seat rail arrangement and the actuating lever is kinematically coupled to the seat part.

14. The vehicle seat as claimed in claim 9, further comprising:
 a seat part;
 a seat rail arrangement; and
 height adjustment kinematics with a front link and a rear link configured to height adjust the seat part relative to the seat rail arrangement, wherein:
 the locking device of the further component locks the seat rail arrangement; and
 the actuating device unlocks locking device of the further component;
 the first segment is kinematically coupled to a rail profile of the seat rail arrangement and the actuating lever is kinematically coupled to the seat part.

15. The vehicle seat as claimed in claim 14, wherein the front link is firstly coupled to the rail profile so as to be rotatable about the first axis and is secondly coupled to the seat part so as to be rotatable about an axis of rotation, wherein the axis of rotation is aligned with the second axis in the unactuated state of the actuating device.

* * * * *